(12) United States Patent
Frerichs et al.

(10) Patent No.: US 6,991,725 B2
(45) Date of Patent: Jan. 31, 2006

(54) SWITCHABLE DIESEL FUEL FILTER ASSEMBLY

(76) Inventors: Stephen A. Frerichs, 901 Crested Butte, Hewitt, TX (US) 76643; George H. Frerichs, 843 CR3510, Valley Mills, TX (US) 76689

( * ) Notice: Subject to any disclaimer, the term of this patent is extended or adjusted under 35 U.S.C. 154(b) by 207 days.

(21) Appl. No.: 10/280,406

(22) Filed: Oct. 25, 2002

(65) Prior Publication Data

US 2004/0079695 A1 Apr. 29, 2004

(51) Int. Cl.
*B01D 35/12* (2006.01)

(52) U.S. Cl. .................. 210/249; 210/341; 210/421

(58) Field of Classification Search ............... 210/254, 210/340, 420, 421, 249, 341
See application file for complete search history.

(56) References Cited

U.S. PATENT DOCUMENTS

| 756,892 | A | * | 4/1904 | Quinn ..................... 210/340 |
|---|---|---|---|---|
| 2,095,447 | A | * | 10/1937 | Lentz ..................... 210/333.1 |
| 2,492,704 | A | * | 12/1949 | Lentz ..................... 210/333.1 |
| 3,295,685 | A | * | 1/1967 | Young ..................... 210/323.2 |
| 3,447,684 | A | * | 6/1969 | Morrison ................. 210/108 |
| 4,334,995 | A | * | 6/1982 | Mahon ..................... 210/340 |
| 6,485,636 | B1 | * | 11/2002 | Moss ....................... 210/117 |

* cited by examiner

Primary Examiner—Matthew O. Savage
(74) Attorney, Agent, or Firm—David G. Henry

(57) ABSTRACT

A switchable fuel filter assembly with alternate fuel paths which carry fuel, respectively, through alternate fuel filters depending on the position of a valve member.

2 Claims, 3 Drawing Sheets

SWITCHABLE DIESEL FUEL FILTER ASSEMBLY

BACKGROUND OF THE INVENTION

1. Field of the Invention

The present invention relates to motor vehicle accessories and fuel systems.

2. Background Information

Diesel engine vehicles are more prone to disablement from fuel filter stoppage than gasoline vehicles. This is true, in part, because diesel fuel is less "pure" than more gasoline, and impurities will often accumulate and clog a fuel filter.

Presently, a clogged fuel filter will disable a vehicle until or unless the filter is removed and replaced. This is certainly an inconvenience, but is more than that. Under certain circumstances, safety become far more a prominent issue than convenience, when, for example, a fuel filter reaches a level of occlusion during use that the engine loses most or all of this power, and this occurs on a busy highway or freeway. Clearly, if this occurs with a tractor trailer under such circumstances, the safety issues because of the traffic entanglements are numerous.

There is virtually nothing in the practical realm that anyone can do to prevent fuel filters from clogging. In so doing, fuel filters are, in essence, simply doing what they are designed to do—catch contaminants before they reach fuel injectors, which are much more expensive to service or replace.

Even if one were to change fuel filters periodically in anticipation of clogging and in view of a more or less "normal" rate of occlusion, variations in fuel contamination would inevitably fail, from time to time, to "catch" a fuel filter in time to prevent all power losses.

What is needed, therefore, is a device or system which accommodates the inevitability of fuel filter stoppage by providing immediate alternative fuel pathways once a stoppage is noted. It is an object of the present invention to obviate the inconvenience and safety hazards which attend diesel fuel filter stoppage, and in so doing provide just such a device or system.

DETAILED DESCRIPTION OF THE PREFERRED EMBODIMENT

Figure 1:
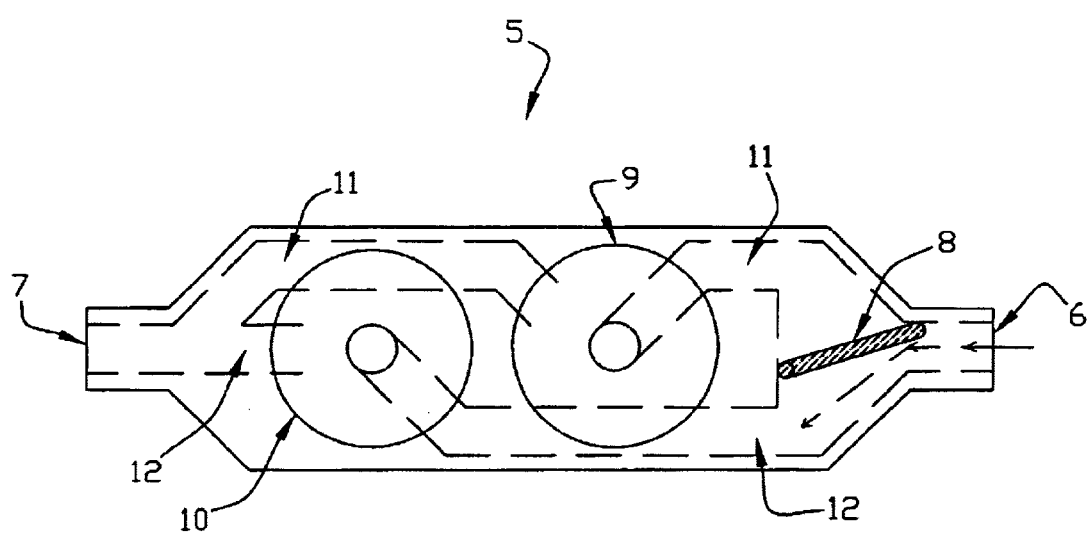
FIG. 1 is a top plan, cross sectional view of a filter switching assembly of the present invention, with the switching means positioned for directing fuel in the first of two fuel pathways.
Figure 2:
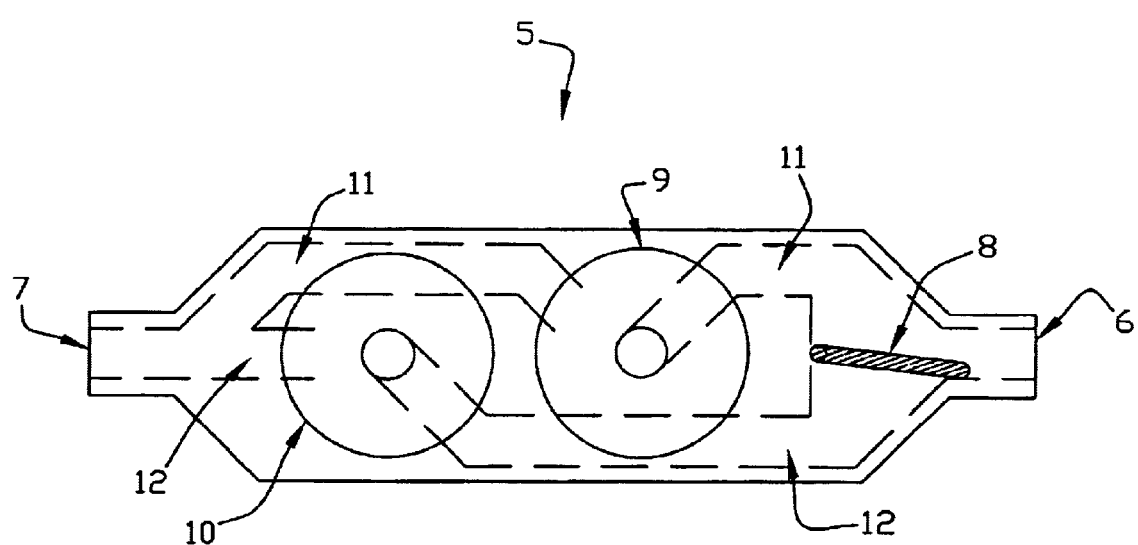
FIG. 2 is a top plan, cross sectional view of a filter switching assembly of the present invention, with the switching means positioned for directing fuel in the second of two fuel pathways.

Referring to FIGS. 1 and 2, the switchable diesel fuel filter assembly of the present invention is identified generally by the reference number 5. Filter assembly 5 includes a fuel ingress port 6 and a fuel egress port 7. A valve assembly 8 (shown only in concept form, as such valve may take many forms in actual reduction to practice) is switchable between a first position (FIG. 1) where fuel is directed through conduit, or fuel path 12, in which fuel filter 10 is in-line, or a second position (FIG. 2) where fuel is directed through conduit, or fuel path 11, in which fuel filter 9 is in-line.

Clearly, fuel egress port 7 delivers fuel to the down stream fuel system of a vehicle in which the present filter assembly 5 is installed. Accordingly, if one operates with valve means 8 in the first position, and filter 10 becomes clogged, moving valve means to the second position will simply re-direct fuel to pass through filter 9 which, if one has properly services the filter assembly 5, will be a "fresh filter."

Figure 3:
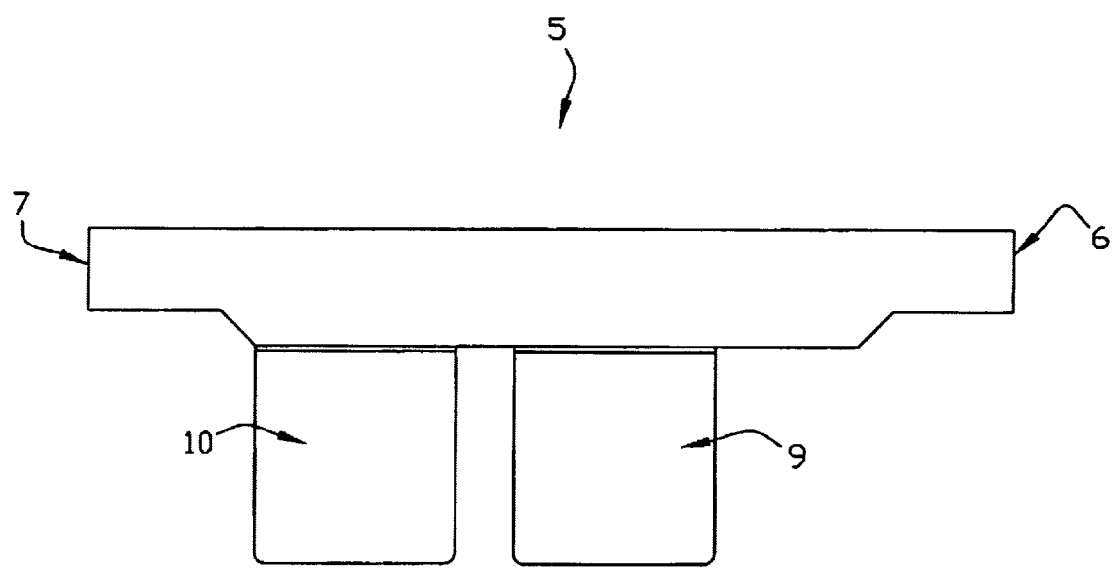
FIG. 3 is a side elevational view of a preferred embodiment of the present invention.

As shown in FIG. 3, the filter assembly 5 includes a filter head 13 having a lower surface and extending horizontally between first and second ends, the first end having the fuel ingress port 6 and the second end having the fuel egress port 7. As shown in FIG. 1, a fuel ingress passage 14 extends through the filter head 13 from the fuel ingress port 6 to a fuel ingress junction 15 (see FIG. 1). A first ingress branch passage 16 extends through the filter head from the fuel ingress junction 15 to a first filter inlet connection 17 on the lower surface of the filter head. A second fuel ingress passage 18 extends through the filter head from the fuel ingress junction 15 to a second filter inlet connection 19 on the lower surface of the filter head. A fuel egress passage 20 extends through the filter head from the fuel egress port 7 to a fuel egress junction 21. A first fuel egress passage 22 extends from the fuel egress junction 20 to a first filter outlet connection 23 located on the bottom surface of the filter head proximate the first filter intake connection 17. A second fuel egress passage 24 extends from the fuel egress junction 20 to a second fuel filter outlet connection 25 located on the bottom surface of the filter head proximate the second filter intake connection. As shown in FIG. 1, the fuel ingress port 6, the fuel egress port 7, the first filter inlet connection 17, and the second filter inlet connection 19 include central axes that are parallel to and coincident with a single vertical plane. The first filter inlet connection 17 is positioned closer to the fuel ingress port 6 than the second filter inlet connection 19, and the second filter inlet connection 19 is positioned closer to the fuel egress port 7 than the first filter inlet connection 17. The fuel ingress junction 15 is positioned horizontally between the fuel ingress port 6 and the first filter inlet connection 17, and the fuel egress junction 21 is positioned horizontally between the fuel egress port 7 and the second filter inlet connection 19. A first fuel filter 9 is provided including a centrally located inlet connection connected to the first filter inlet connector 17 and a filter outlet connected to the first filter outlet connection 23. A second fuel filter 10 is provided including a centrally located inlet connected to the second filter inlet connection 19 and a filter outlet connected to the second filter outlet connection 25. Valve means 8 is located in the fuel ingress junction 15 and is positionable in first and second valve means positions, respectively for selectively directing fuel entering the fuel ingress port through either the first fuel ingress passage 16 to the first fuel filter 9 or through the second fuel ingress 18 passage to the second fuel filter 10.

Filter assembly 5 would be useful and of considerable convenience, even if valve means required actuation directly at filter assembly 5 (as if a lever or know allowed actuation). However, such would not completely address the safety concerns of a power loss due to fuel filter stoppage while driving. Therefore, any preferred embodiment of the present invention will include remote valve actuation means (not shown in the drawings).

Remote valve actuation means may come in any of several forms. An electric, solenoid type of actuator, which may be operated from the cab of a truck, for example, may be one option of remotely operating the switching function of fuel filter assembly 5, whereby, upon the notice of a power loss which is apparently the result of clogged fuel filter, the driver can stitch to the "good" filter. Even a cable-based, purely mechanical actuator would suffice, whereby a push-pull, or even dial type switch accessible to the driver could move the external actuator portion of valve means 8 between its two positions. These and other actuation options are well within the skills of persons reasonable skilled in designing and manufacturing vehicle systems and accessories, and need not be further elaborated for enabling disclosure purposes.

Referring to FIG. 3, in the preferred embodiment of the present invention, each of fuel filters 9 and 10 reside in a screw-on filter housing for each removal and replacement.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A switchable fuel filter assembly comprising:

a filter head having a lower surface and extending horizontally between first and second ends, said first end having a fuel ingress port and said second end having a fuel egress port;

a fuel ingress passage extending through said filter head from said fuel ingress port to a fuel ingress junction;

a first ingress branch passage extending through said filter head from said fuel ingress junction to a first filter inlet connection on said lower surface;

a second fuel ingress passage extending through said filter head from said fuel ingress junction to a second filter inlet connection on said lower surface;

a fuel egress passage extending through said filter head from said fuel egress port to a fuel egress junction;

a first fuel egress passage extending from said fuel egress junction to a first filter outlet connection located on the bottom surface of the filter head proximate the first filter intake connection;

a second fuel egress passage extending from said fuel egress junction to a second fuel filter outlet connection located on the bottom surface of the filter head proximate the second filter intake connection;

wherein said fuel ingress port, said fuel egress port, said first filter inlet connection, and said second filter inlet connection include central axes that are parallel to and coincident with a single vertical plane;

wherein said first filter inlet connection is positioned closer to said fuel ingress port than said second filter inlet connection and said second filter inlet connection is positioned closer to said fuel egress port than said first filter inlet connection;

wherein said fuel ingress junction is positioned horizontally between said fuel ingress port and said first filter inlet connection;

wherein said fuel egress junction is positioned horizontally between said fuel egress port and said second filter inlet connection;

a first fuel filter including a centrally located inlet connection connected to said first filter inlet connector and a filter outlet connected to said first filter outlet connection;

a second fuel filter including a centrally located inlet connected to said second filter inlet connection and a filter outlet connected to said second filter outlet connection;

valve means located in said fuel ingress junction and positionable in first and second valve means positions, respectively for selectively directing fuel entering said fuel ingress port through either said first fuel ingress passage to said first fuel filter or through said second fuel ingress passage to said second fuel filter.

2. The switchable fuel filter assembly of claim 1 further comprising remote valve switching means for positioning said valve means alternatively between said first and second valve means positions.

* * * * *